United States Patent
Zillmer et al.

(10) Patent No.: US 8,402,747 B2
(45) Date of Patent: Mar. 26, 2013

(54) METHOD FOR HEATING UP A CATALYTIC CONVERTER

(75) Inventors: Michael Zillmer, Sickte (DE); Ekkehard Pott, Gifhorn (DE); Matthias Holz, Lehre (DE); Kai Philipp, Lagesbuettel (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 1333 days.

(21) Appl. No.: 10/546,674

(22) PCT Filed: Feb. 23, 2004

(86) PCT No.: PCT/EP2004/001776
§ 371 (c)(1),
(2), (4) Date: Aug. 22, 2005

(87) PCT Pub. No.: WO2004/076826
PCT Pub. Date: Sep. 10, 2004

(65) Prior Publication Data
US 2006/0162321 A1   Jul. 27, 2006

(30) Foreign Application Priority Data
Feb. 28, 2003 (DE) .................. 103 10 024

(51) Int. Cl.
*F01N 3/00* (2006.01)
*F01N 3/10* (2006.01)

(52) U.S. Cl. ............. 60/285; 60/274; 60/286; 60/295; 60/300; 60/301

(58) Field of Classification Search ............ 60/274, 60/276, 277, 285, 286, 295, 300, 301; 123/672, 123/676, 692
See application file for complete search history.

(56) References Cited

U.S. PATENT DOCUMENTS

| | | | | |
|---|---|---|---|---|
| 5,732,554 A | * | 3/1998 | Sasaki et al. | 60/278 |
| 5,974,792 A | * | 11/1999 | Isobe | 60/278 |
| 6,014,859 A | * | 1/2000 | Yoshizaki et al. | 60/285 |
| 6,237,330 B1 | * | 5/2001 | Takahashi et al. | 60/285 |
| 6,318,075 B1 | * | 11/2001 | Günther et al. | 60/285 |
| 6,378,297 B1 | * | 4/2002 | Ito et al. | 60/284 |
| 6,543,219 B1 | * | 4/2003 | Surnilla | 60/285 |
| 6,622,480 B2 | * | 9/2003 | Tashiro et al. | 60/295 |
| 6,637,189 B1 | * | 10/2003 | Boegner et al. | 60/274 |
| 6,666,019 B2 | * | 12/2003 | Kawatani et al. | 60/286 |

FOREIGN PATENT DOCUMENTS

| | | |
|---|---|---|
| DE | 195 22 165 | 12/1995 |
| DE | 199 10 503 C1 | 7/2000 |
| DE | 100 20 639 | 11/2000 |
| DE | 100 20 794 | 6/2001 |
| DE | 100 64 247 A1 | 7/2001 |

(Continued)

*Primary Examiner* — Kenneth Bomberg
*Assistant Examiner* — Audrey K Bradley
(74) *Attorney, Agent, or Firm* — Norris McLaughlin & Marcus, P.A.

(57) ABSTRACT

At least one chemical heating measure, which causes an increase in the catalytic converter temperature essentially by introducing into the exhaust gas channel additional chemical energy in excess of energy provided at an initial engine operating point, is combined with at least one thermal heating measure, which causes an increase in the catalytic converter temperature essentially by introducing into the exhaust gas channel additional thermal energy in excess of energy provided at an initial engine operating point, so that a major fraction of the chemical energy is introduced temporally before a major fraction of the thermal energy is introduced.

14 Claims, 4 Drawing Sheets

FOREIGN PATENT DOCUMENTS

| | | |
|---|---|---|
| DE | 101 31 802 A1 | 1/2002 |
| DE | 100 16 219 | 2/2002 |
| DE | 100 40 515 | 2/2002 |
| DE | 100 40 516 | 2/2002 |
| DE | 101 58 696 A1 | 6/2002 |
| DE | 101 01 593 A1 | 7/2002 |
| DE | 102 24 601 | 1/2003 |
| DE | 101 42 669 A1 | 4/2003 |
| EP | 0 902 172 A2 | 3/1999 |
| EP | 0 982 489 A2 | 3/2000 |
| EP | 1 205 648 | 5/2002 |
| WO | WO 00/08328 | 2/2000 |
| WO | WO 00/57045 | 9/2000 |

* cited by examiner

METHOD FOR HEATING UP A CATALYTIC CONVERTER

FIELD OF THE INVENTION

The invention relates to a method for heating at least one catalytic converter arranged in an exhaust gas channel of an internal combustion engine.

BACKGROUND

Catalytic converter systems used for cleaning exhaust gases of internal combustion engines frequently include a pre-catalytic converter placed proximate to the engine and a downstream main catalytic converter. $NO_x$ storage catalytic converters are increasingly employed as main catalytic converters in gasoline engines, which operate at least temporally in a lean operating mode. $NO_x$ storage catalytic converters, unlike conventional three-way catalytic converters, are capable of converting nitric oxides ($NO_x$) even when the composition of the fuel mixture is super-stoichiometric (i.e., $\lambda > 1$). When operating under lean conditions with excess air, the nitric oxides are stored on a storage component of the catalytic converter by forming nitrates. During periodic short regeneration phases, where the engine is operated sub-stoichiometrically, i.e., at $\lambda \leq 1$, the nitric oxides are desorbed and converted on a precious metal component of the $NO_x$ storage catalytic converter to compounds that are less hazardous to the environment. The operating temperature window of $NO_x$ storage catalytic converters, where $NO_x$ is stored and converted under lean exhaust gas conditions, is typically between 250 and 550° C.

Sulfur contained in the fuel and the resulting combustion product $SO_2$ slowly deactivate the $NO_x$ storage catalytic converter under typical driving conditions. The $SO_x$ is deposited on the converter elements in the form of relatively stable sulfates which are freed up in the catalytic converter only at temperatures above approximately 650° C. This so-called sulfur poisoning increasingly blocks the storage locations of the $NO_x$ storage catalytic converter which are then no longer available for storing $NO_x$. The amount of nitric oxides, which can be maximally stored under lean operating conditions, and the conversion rate then also gradually decrease. The time intervals during which the engine can operate under lean conditions before a $NO_x$ regeneration is required become shorter with increasing sulfur loading, which causes an increased fuel consumption. If a very large quantity of sulfur is stored, then the lean operating mode must be partially, sometimes even entirely, suppressed in favor of a stoichiometric operating mode to prevent the emission of large quantities of nitric oxide. Sulfur regeneration of the $NO_x$ storage catalytic converter can be performed from time to time to counteract an exceedingly large decrease in the $NO_x$ storage capacity due to sulfur poisoning, whereby alternatingly rich and lean exhaust gases are introduced into the catalytic converter at temperatures above its desulphurization temperature (for example 650° C.) for an exhaust gas having a lambda value of $\lambda \leq 1$. If the vehicle is operated under a partial load or a full load at higher RPM and engine loads, for example on divided highways or freeways, then the aforementioned desulphurization parameters, in particular the desulphurization temperature, can be reached spontaneously, whereby the sulfur is removed during normal driving operation (passive desulphurization). Conversely, if the vehicle is operated over longer distances under a low load, then the temperature in the catalytic converter is typically below the desulphurization temperature, which may require an actively initiated desulphurization. In this case, special heating measures are required for the catalytic converter to reach a sufficiently high converter temperature.

For example, it is known to retard the ignition angle, wherein the ignition time of the air-fuel mixture is retarded relative to an ignition angle that produces the highest engine efficiency. Retardation of the ignition angle reduces the combustion efficiency and simultaneously increases the combustion temperature or exhaust gas temperature. The hotter exhaust gas heats the catalytic converter faster.

Another method for increasing the exhaust gas temperature relies on so-called multiple injection, which has recently been disclosed for the direct-injection, external-ignition combustion engines (e.g., WO 00/08328, EP 0 982 489 A2, WO 00/57045). The particular combustion characteristic of the multiple injection operation increases the exhaust gas temperature compared to a purely homogeneous operation. The divided injection method also increases the ignition stability and permits a particularly late ignition angle for heating the catalytic converter.

Another heating measure known in the art involves adjusting the air-fuel ratio of individual cylinders of the engine in opposite directions, which is also referred to as lambda split. In this process, several cylinders are operated with a mixture richer than a total lambda, while other cylinders are operated with a leaner mixture. Combustion in the cylinders operating in the rich mode is incomplete compared to $\lambda=1$ operation. The non-combusted components of the exhaust gas are then exothermally converted with the residual oxygen fraction of the lean-running cylinders in a downstream catalytic converter, thereby heating the catalytic converter.

Measures for heating a catalytic converter are not only required for desulphurization of $NO_x$ storage catalytic converters, but also for raising the temperature of the catalytic converters to their desired operating temperature after an engine start. In particular, pre-catalytic converters placed proximate to the engine should be brought very quickly to their respective light-off temperature to minimize a so-called pollutant leakage during the startup phase.

However, since all heating measures increase the fuel consumption, there is a need for more effective methods to heat-up catalytic converters in the shortest possible time.

SUMMARY OF THE INVENTION

It is therefore an object of the present invention to provide a method for quickly heating up catalytic converters in a fuel-saving manner, which in particular optimizes heat-up of $NO_x$ storage catalytic converters located distant from the engine.

The object is solved by a method with the characterizing features of claim 1. According to the invention, at least one chemical heating measure, which causes an increase in the catalytic converter temperature essentially by introducing into the exhaust gas channel additional chemical energy in excess of energy provided at an initial engine operating point, is combined with at least one thermal heating measure, which causes an increase in the catalytic converter temperature essentially by introducing into the exhaust gas channel additional thermal energy in excess of energy provided at an initial engine operating point, so that a major fraction of the chemical energy is introduced temporally before a major fraction of the thermal energy is introduced.

The term "introduction of chemical energy" refers to a composition of the exhaust gas which heats the catalytic converter by an exothermal conversion reaction of the exhaust gas components on the catalytic converter to be heated. Conversely, "introduction of thermal energy" is the result of high exhaust gas temperatures. It should also be noted that a chemical heating measure in the context of the present invention always includes introduction of a small amount of thermal energy, for example, because an HC-rich exhaust gas can also have relatively high temperatures. On the other hand, a thermal heating measure in the context of the present invention can also include introduction of an insignificant amount of chemical energy. It is important for the invention that the introduction of chemical energy (in addition to the energy supplied during normal engine operation) represents the major contribution to additional heating of the catalytic converter by the chemical heating measure, and that the high exhaust gas temperature (in addition to the exhaust gas temperature supplied during normal engine operation) represents the major contribution to additional heating of the catalytic converter by the thermal heating measure. Moreover, the term "major fraction" of the introduced chemical or thermal energy refers to the additional amount of energy introduced chemically or thermally.

As will be described in more detail with reference to the exemplary embodiments, the initial chemical heating measure can heat up the catalytic converter very fast, in particular a catalytic converter located distant from the engine (heat-up phase). Optionally, a pre-catalytic converter can be connected upstream of the main catalytic converter. Conversely, during the second heating phase, the attained high catalytic converter temperature can advantageously be kept essentially constant by the at least one thermal heating measure (holding phase). Preferably, the at least one chemical and the at least one thermal heating measure are performed with a temporal overlap, whereby advantageously the introduced thermal energy increases, while the introduced chemical energy has already been reduced.

According to an advantageous embodiment of the invention, the chemical heating measure includes a counter-acting lambda adjustment of individual cylinders, whereby a first cylinder or cylinder group is operated with an air-fuel mixture which is leaner than a desired total lambda value, and a second cylinder or cylinder group is operated with a richer mixture. Preferably, the total lambda value is regulated during the heat-up phase at least approximately to a stoichiometric value of $\lambda=1$. The first cylinder or the first cylinder group is operated with a super-stoichiometric lambda value of $\lambda>1$, and the second cylinder or the second cylinder group is operated with a sub-stoichiometric lambda value of $\lambda<1$. With this lambda-split method, a very large quantity of chemical energy can be introduced into the catalytic converter system, whereby the catalytic converter is heated up by the exothermal catalytic conversion of the exhaust gas components that were not converted during the non-stoichiometric combustion process of the engine. This method of lambda detuning is particularly advantageous if a catalytic converter located distant from the engine, in particular a $NO_x$ storage catalytic converter, must be heated up quickly. In this approach, the partial exhaust gas flows exiting the at least one first cylinder and the at least one second cylinder initially flow through separate exhaust gas pipes which can each include at least one pre-catalytic converter, before being combined upstream of the catalytic converter to be heated.

The at least one thermal heating measure can include, for example, an ignition angle retardation and/or multiple injection. Retardation of the ignition angle reduces the efficiency of the combustion and simultaneously increases the combustion temperature and the exhaust gas temperature. In multiple-injection operation, a total fuel quantity to be supplied to a cylinder during an operating cycle is supplied to the combustion chamber of a cylinder in at least two injection steps. A first, early injection step (homogeneous injection) occurs during an intake stroke of the cylinder, so that the injected fuel quantity is essentially homogeneously distributed in the combustion chamber at a later ignition time. A second, late injection step (stratified injection) is performed during a subsequent compression stroke, in particular during the second half of the compression stroke, resulting in a so-called stratified charge, where the injected fuel cloud is concentrated in the cylinder essentially in the region around a spark plug. A multiple injection operation of an internal combustion engine therefore represents a mixed operation of stratified charging and homogeneous charging. The particular combustion characteristic of this operating mode increases the exhaust gas temperature compared to a purely homogeneous operation and enables particularly late ignition angles. Both thermal methods can therefore advantageously be combined.

A loss in torque caused by a thermal heating measure can advantageously be compensated by increasing a cylinder fill, i.e., by simultaneously increasing the quantity of fuel and air.

According to a particularly advantageous embodiment of the invention, the at least one chemical heating measure is applied until the catalytic converter to be heated reaches at least approximately a predetermined temperature. In particular, this predetermined temperature can be a desulphurization temperature of the $NO_x$ storage catalytic converter located far from the engine in a lean-operating gasoline engine. This process does not preclude a reduction in the amount of the introduced chemical energy before the catalytic converter has reached a predetermined temperature, in particular the desulphurization temperature.

Conversely, according to an advantageous embodiment of the method, the introduced energy is maintained at an approximately constant level for a certain duration of the active thermal heating phase, in particular for the duration of a desulphurization. This provides the most efficient thermal heating during the heating phase of the catalytic converter. Conversely, the amount of additional thermal heat is reduced, if an increase of the engine RPM and/or the engine load in itself produce higher exhaust gas temperatures.

Other advantageous embodiments of the invention are recited in the additional dependent claims.

BRIEF DESCRIPTION OF THE DRAWINGS

Exemplary embodiments of the invention will now be described with reference to the corresponding drawings, which show in.

DETAILED DESCRIPTION OF THE INVENTION

Figure 1:
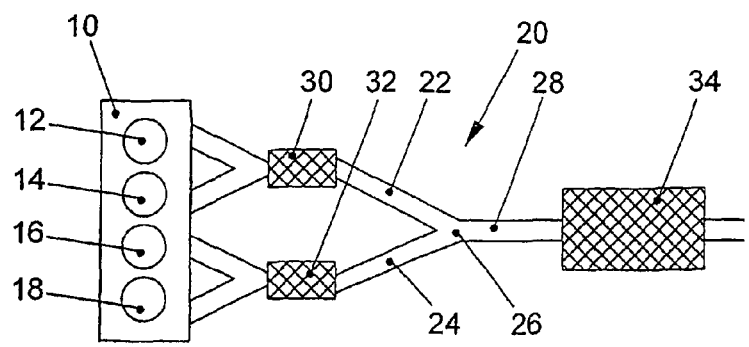
FIG. 1 schematically, an exhaust gas system according to a particularly advantageous embodiment of the invention, FIG. 2 temperature curves of a pre-catalytic converter and a $NO_x$ storage catalytic converter with a purely thermal heating measure produced by conventional ignition angle retardation, FIG. 3 temperature curves of a pre-catalytic converter and a $NO_x$ storage catalytic converter with a purely chemical heating measure produced by conventional lambda detuning, FIG. 4 temperature curves of a pre-catalytic converter and a $NO_x$ storage catalytic converter with a combination of a chemical and a thermal heating measure according to a first embodiment of the method of the invention, and FIG. 5 temperature curves of a pre-catalytic converter and a $NO_x$ storage catalytic converter with a combination of a chemical and a thermal heating measure according to a second embodiment of the method of the invention.

FIG. 1 shows an internal combustion engine 10 in form of a gasoline engine capable of lean operation, which is preferably provided with direct fuel injection and can therefore operate with a stratified charge. The exemplary engine 10 includes four cylinders 12 to 18. Exhaust gas exiting the internal combustion engine 10 is post-treated in a segmented exhaust gas system having the reference numeral 20. More particularly, the exhaust gases of the cylinders 12 and 14 flow through an exhaust gas pipe 22 of a first section of the exhaust gas system 20, whereas in the exhaust gases of the cylinders 16 and 18 flow through a separate exhaust gas pipe 24. Both partial exhaust gas flows are combined at a junction 26 to a common exhaust gas channel 28.

Each of the separate exhaust gas pipes 22, 24 includes a pre-catalytic converter 30, 32 located proximate to the engine. More particularly, the pre-catalytic converters 30, 32 are three-way catalytic converters, which almost completely convert the exhaust gas fractions HC, CO and $NO_x$ in a stoichiometric exhaust gas with $\lambda=1$. A $NO_x$ storage catalytic converter 34 is located in the common exhaust gas channel 28 downstream of the junction 26, in particular at a location of the vehicle distant from the engine and below the floor.

A $NO_x$ storage catalytic converter, unlike a three-way catalytic converter, is a device with a $NO_x$ storage efficiency of at least 80%, in particular at least 90%, preferably at least 95%, when fresh (unused, but following conditioning for 4 hours at 650±30° C. average converter temperature and $\lambda=1\pm0.03$ with at most 1.5% $O_2$ in the inflowing gas having a space velocity of 40,000±5,000 $h^{-1}$) at 350±20° C. average converter temperature—immediately following a regeneration phase of at least 60 seconds with $\lambda=0.9$—with a space velocity of 40,000±20,000 $h^{-1}$ at $\lambda=2.2\pm0.2$, with an initial HC concentration below 100 ppm $HC_3$, and with an initial $NO_x$ concentration of 250-500 ppm after storing a $NO_2$ mass of 500 mg per liter of catalytic converter volume.

Sulfur-containing fuel increasingly sulphurizes the $NO_x$ storage catalytic converter 34 by storing $SO_x$ in form of sulfates, which gradually reduce the $NO_x$ storage capacity. The $NO_x$ storage catalytic converter 34 must therefore be periodically desulphurized at catalytic converter temperatures of at least 620° C., preferably at least 650° C. If these temperatures are not reached under normal driving conditions over extended periods of time, then deliberate heating measures that increase the catalytic converter temperature are unavoidable.

Figure 2:
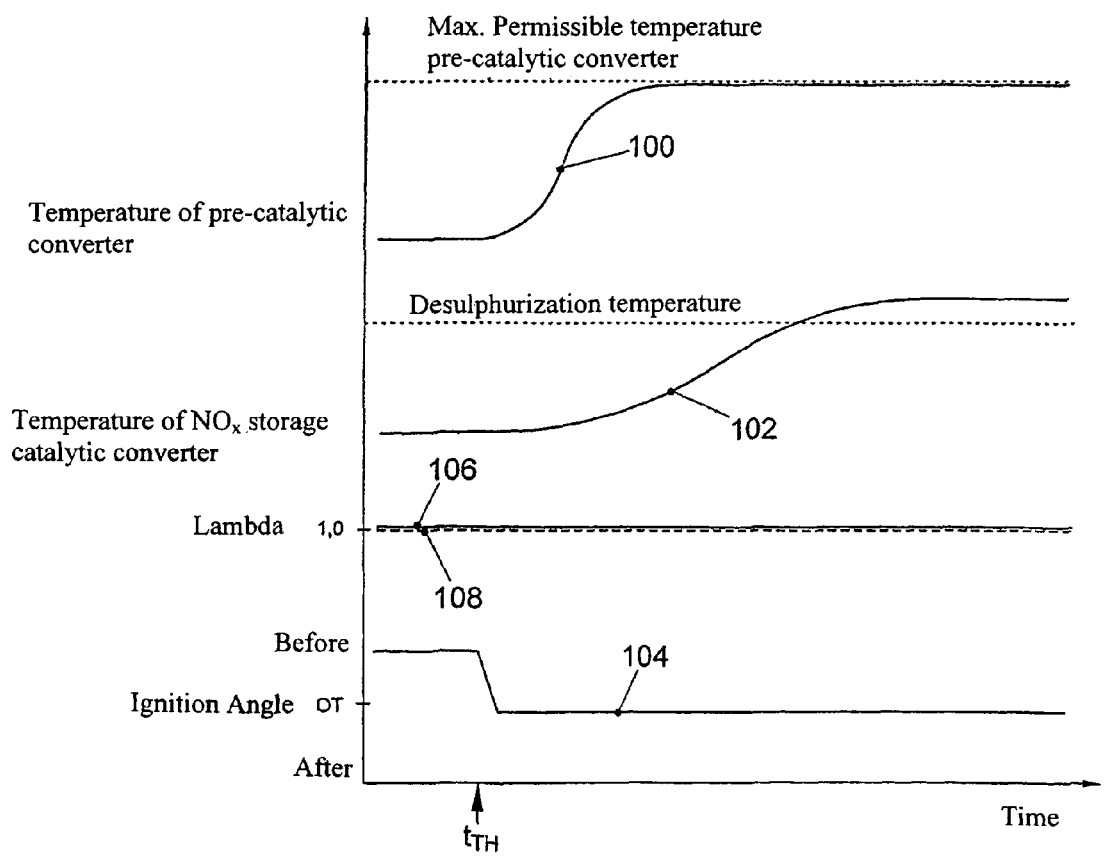

FIG. 2 shows the time dependence of the temperature in the pre-catalytic converters 30, 32 (curve 100) and the temperature dependence of the $NO_x$ storage catalytic converter 34 (curve 102), if ignition angle retardation (curve 104) is the only applied heating measure, as with conventional approaches. The ignition angle, which for optimal efficiency is normally set at an ignition time before the upper dead center OT, is moved at time $t_{TH}$ towards a later ignition time, for example at OT or even after OT. In this approach, the cylinders 12 to 18 are operated identically, for example, at $\lambda=1.0$ (curves 106 and 108).

The late ignition reduces the combustion efficiency and increases the exhaust gas temperature which results in a fast heat-up of the pre-catalytic converters 30, 32. Because both pre-catalytic converters 30, 32 have an essentially identical characteristic, only one temperature curve (curve 100) is shown. The storage catalytic converter 34, unlike the pre-catalytic converters 30, 32, reacts to the increased exhaust gas temperature with a certain delay and also reaches lower end values. The slow temperature response of the storage catalytic converter is caused by the thermal inertia of the exhaust gas pipes as well as by heat losses along with the exhaust gas path. The $NO_x$ storage catalytic converter 34 therefore reaches its desulphurization temperature and also its steady-state temperature with a substantial delay if only thermal heating measures are applied. Moreover, the additional thermal energy introduced by the ignition angle retardation is limited by the highest permissible temperature of the pre-catalytic converters 30, 32. To provide a constant engine torque, the cylinder fill of cylinders 12 to 18 is typically increased in parallel with the ignition angle retardation.

Figure 3:
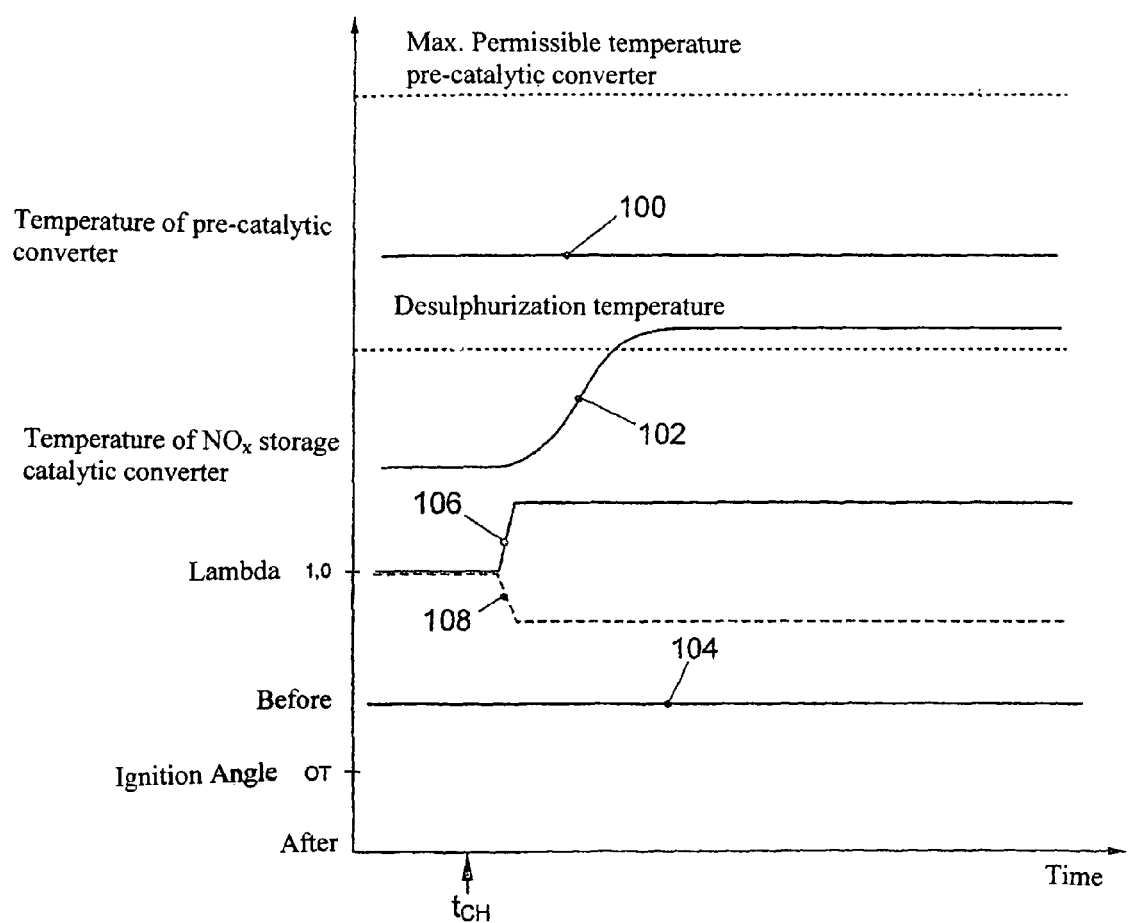

FIG. 3 shows temperature curves of the pre-catalytic converters 30, 32 and of the $NO_x$ storage catalytic converter 34, if the ignition angle is held constant and lambda detuning of the cylinders 12 to 18 at time $t_{CH}$ is the only heating measure employed in the exhaust gas system 20 of FIG. 1. In this case, the cylinders 12, 14 of a first cylinder group are operated super-stoichiometrically with a combustion lambda of $\lambda>1$ (curve 106), whereas the cylinders 16, 18 of a second cylinder group are operated sub-stoichiometrically with $\lambda<1$ (curve 108). The lambda values of the exhaust gas of the two partial exhaust gas flows are controlled so that after they intermix, the desired total lambda, in particular the original lambda value, is in the range of 0.96 to 1.04, in particular in the range of 0.98 to 1.02, and most advantageously between 0.995 and 1.005. Due to the non-stoichiometric composition of the two partial exhaust gas flows, the two pre-catalytic converters 30, 32 do not exhibit a significant conversion reaction and hence also no exothermic reaction. Only the low $O_2$ concentration in the exhaust gases limits the conversion of unburned hydrocarbons HC, carbon monoxide CO and hydrogen $H_2$ in the sub-stoichiometrically operating cylinders 16, 18 (curve 108). Conversely, these combustible exhaust gas fractions are missing, or are present in only relatively low concentrations, in the super-stoichiometrically operated cylinders 12, 14 (curve 106). Because of the absence of significant catalytic conversion at the pre-catalytic converters 30, 32, their temperatures are practically unaffected by the chemical heating measure of lambda detuning and continue to remain significantly below the maximum permissible temperature (curve 100).

On the other hand, mixing of the partial exhaust gas flows at the junction 26 upstream of the main catalytic converters 34 produces an exhaust gas with a high chemical energy content, whereby the reduction and oxidation agents of the exhaust gas are present in stoichiometric form. The conversion reaction between the reduction agents HC, CO and $H_2$ and the oxidation agents $O_2$ and $NO_x$ in the $NO_x$ storage catalytic converter 34 produces a large reaction enthalpy, which rapidly heats the storage catalytic converter 34. The storage catalytic converter 34 then very quickly reaches its intended desulphurization temperature (curve 102). The amount of chemically bound energy, i.e., the amount of introduced chemical energy and hence also of the exothermic energy in the main catalytic converters 34, can be affected by the difference between the lambda values of the two groups. Because the pre-catalytic converters 30, 32 and the exhaust gas pipes 22, 24, 28 need not be heated with this method, the storage catalytic converter 34 can heat up much faster compared to ignition angle retardation alone (FIG. 2).

With this method, the ignition timing angles are maintained at an approximately constant value (curve 104). However, the ignition angles can also be adjusted, for example to compensate for torque changes resulting from the changed fuel mixture composition and/or cylinder fill.

Chemical heating measures in general and lambda detuning in particular are advantageous because of the rapid heat-up of the storage catalytic converter 34. Disadvantageously, however, very high temperatures may locally be generated in the storage catalytic converter. If the temperature in the catalytic converter bed is already very high in some regions, then local temperature peaks in these regions can exceed the maximum permissible temperature. For this reason, purely chemical heating measures may be problematic when the catalytic converter ages.

According to the invention, chemical and thermal heating measures are therefore advantageously combined. In particular, with an upstream chemical heating measure, the storage catalytic converters 34 is rapidly heated to its required desulphurization temperature and this converter temperature is maintained by a thermal heating measure in a subsequent holding phase. Maintaining the temperature of the catalytic converters 34 during the desulphurization by way of lambda detuning has also shown problems, caused by inhomogeneities in the exhaust gas upstream of the storage catalytic converter 34 and by a strong dependence of the desulphurization process on the exhaust gas composition.

Figure 4:
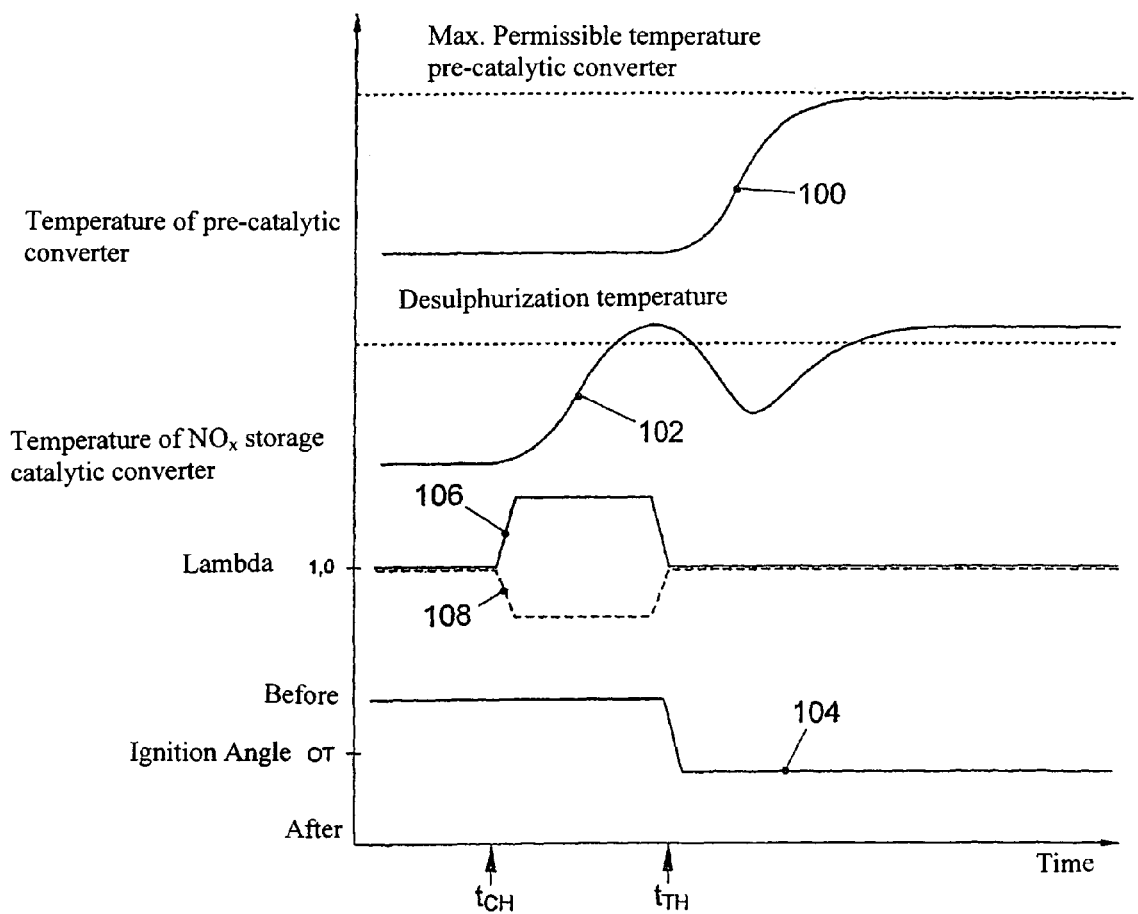

FIG. 4 shows temperature curves for the pre-catalytic converters 30, 32 and the $NO_x$ storage catalytic converter 34 when thermal and chemical heating measures are combined. According to the invention, a chemical heating measure in form of the lambda detuning of the cylinder groups is initially performed to rapidly heat up of the storage catalytic converter 34. Thereafter, without temporal overlap, a thermal heating measure in form of ignition angle retardation is performed to maintain the temperature of the storage catalytic converter 34. It is also evident that the storage catalytic converter 34 quickly reaches its desulphurization temperature because of the lambda split (curve 102). However, the pre-catalytic converters 30 and 32 heat up with a delay after the start of the ignition angle retardation at the time $t_{TH}$ (curve 100). However, the transition from engine operation with lambda detuning to ignition angle retardation is somewhat problematic. The catalytic converter begins to cool down very quickly following the abrupt decrease in the energy released in the $NO_x$ storage catalytic converter 34. Because of the thermal inertia of the exhaust gas pipes, which are heated first, heating of the storage catalytic converter 34 by ignition angle retardation is delayed. As a result, the temperature of the $NO_x$ storage catalytic converter briefly decreases following the transition from chemical to thermal heating and thereafter increases again. This partially cancels out the advantage of the initial rapid heat-up.

Figure 5:
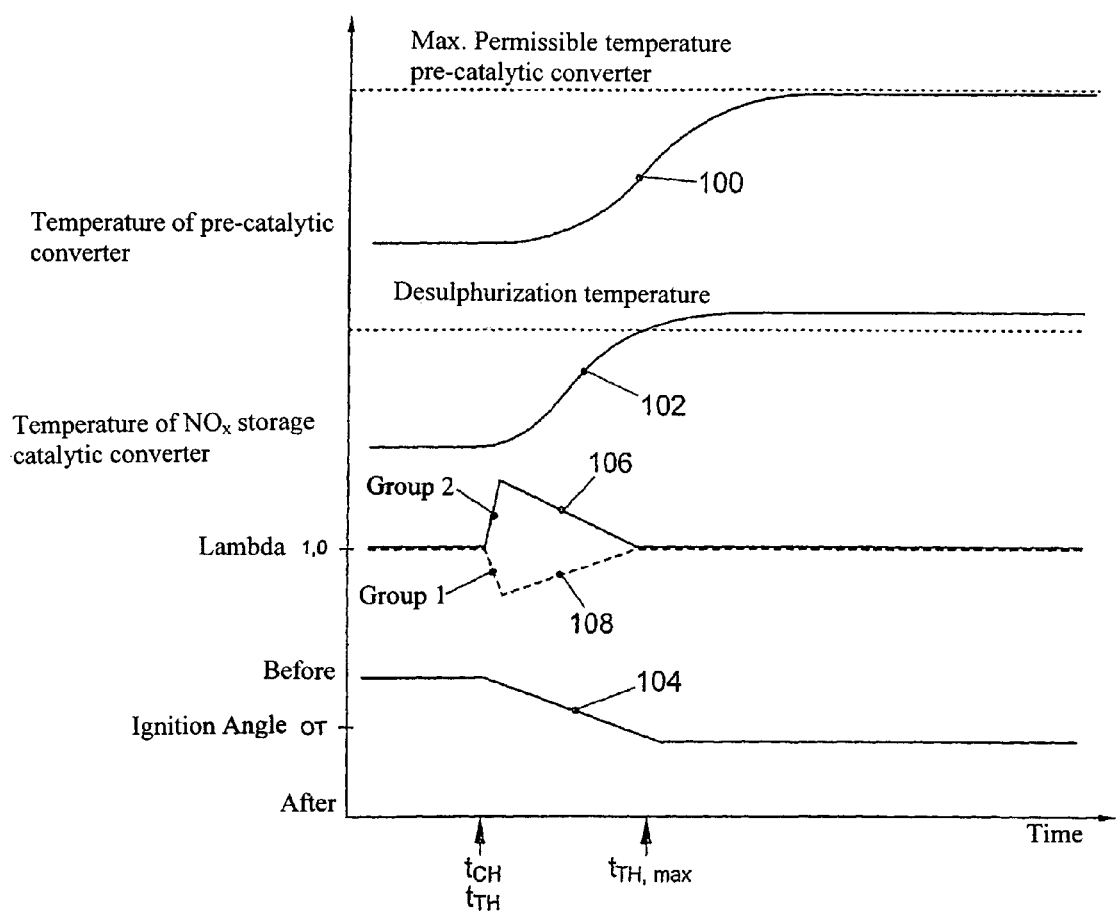

Advantageously, this shortcoming can be overcome by combining the chemical heating measure with the thermal heating measure so that they overlap in time, as illustrated in the example depicted in FIG. 5. In this example, a strong chemical heating measure achieved by lambda detuning is initially employed at a time $t_{CH}$ and then varied over the duration of the heating process (curve 106,108). The difference in lambda between the cylinder groups, which are detuned in opposite directions, is gradually reduced from the start to the end of the heating process. The thermal heating measure involving ignition angle retardation also begins at time $t_{TH}$ concurrent with the start of chemical heating, wherein the retardation is initially small and increases during the chemical heating measure. The exhaust gas pipes can then be slowly heated by the ignition angle retardation, while the storage catalytic converter is heated chemically very rapidly by lambda detuning. Stated differently, most of the chemical energy, i.e., its highest intensity, is introduced in a relatively early phase (heat-up phase), while most of thermal energy is introduced at a later time, and kept constant (holding phase).

Controlling the decrease of the lambda value of the super-stoichiometrically operated cylinders 12 and 14 and the increase of lambda value of the sub-stoichiometrically operated cylinders 16, 18 and the ignition angle retardation need not occur linearly as depicted in the drawing. Instead, degressive and progressive sigmoidal or similar curve shapes are possible. Chemical and thermal heating measures are ideally matched to one another, so that after the first heating phase, which is essentially controlled by the chemical heating measure, the attained temperature of the $NO_x$ storage catalytic converter corresponds essentially to the stationary value attained with the largely thermal heating measure of ignition angle retardation. After the chemical heating measure is reduced, the temperature of the storage catalytic converter 34, in particular in the range of its desulphurization temperature, is actively maintained only by the ignition angle retardation.

The advantageous combination of both heating measures still reduces the heat-up time of the storage catalytic converter 34 compared to a ignition angle retardation alone, while eliminating the intermediate drop in the catalytic converter temperature. Reducing the introduced chemical energy with increasing catalytic converter temperature has also a beneficial effect on the thermal loading and aging of the catalytic converter.

In analogy to the aforedescribed approaches depicted in FIGS. 4 and 5, lambda detuning can also be combined with other thermal heating methods, such as the aforedescribed multiple injection. Moreover, more than one thermal heating method can be employed, for example ignition angle retardation in conjunction with multiple injection, whereby particularly late ignition angles and high exhaust gas temperatures are made possible by multiple injection.

LIST OF REFERENCE SYMBOLS

10 internal combustion engine
12-18 cylinder
20 exhaust gas system
22, 24 exhaust gas pipe
26 junction
28 exhaust gas channel
30, 32 pre-catalytic converter
34 $NO_x$ storage catalytic converter
100 temperature of the pre-catalytic converters
102 temperature of the $NO_x$ storage catalytic converter
104 ignition angle
106 lambda of cylinder group 1
108 lambda of cylinder group 2
OT upper dead center
$t_{TH}$ start of the thermal heating measure
$t_{CH}$ start of the chemical heating measure

The invention claimed is:

1. A method for heating at least one catalytic converter arranged in an exhaust gas channel of an internal combustion engine, comprising the step of combining, during a predetermined time interval including a plurality of consecutive combustion cycles of the engine:
    at least one chemical heating measure including non-combusted fuel, which causes a temperature of the catalytic converter to increase above an original engine operating point essentially by introduction of additional chemical energy into the exhaust gas channel, with
    at least one thermal heating measure, which causes the temperature of the catalytic converter to increase above the original engine operating point essentially by introduction of additional thermal energy into the exhaust gas channel,
    so that a major fraction of the additional chemical energy is introduced into the exhaust channel during the interval before a major fraction of the additional thermal energy is introduced into the exhaust channel;

wherein the at least one chemical heating measure and the at least one thermal heating measure are performed with a temporal overlap; and wherein, during the interval, increasing the additional thermal energy being introduced into the exhaust channel while simultaneously decreasing the additional chemical energy being introduced into the exhaust channel, wherein the increasing of the additional thermal energy being introduced into the exhaust channel and the simultaneous decreasing of the additional chemical energy being introduced into the exhaust channel are conducted gradually.

2. The method according to claim 1, wherein the at least one thermal heating measure comprises a retardation of the ignition angle.

3. The method according to claim 1, wherein the at least one thermal heating measure comprises a multiple injection, wherein at least two fuel injections are performed within an operating cycle of a cylinder, of which at least one injection represents a delayed injection timed to occur during a compression stroke.

4. The method according to claim 1, wherein a cylinder fill is increased to compensate for a torque loss caused by the at least one thermal heating measure.

5. The method according to claim 1, wherein the at least one chemical heating measure is performed until the catalytic converter to be heated reaches at least a predetermined temperature.

6. The method according to claim 5, wherein the predetermined temperature is a desulphurization temperature of the catalytic converter.

7. The method according to claim 1, wherein the internal combustion engine is a lean-running gasoline engine and the catalytic converter to be heated is a NOx storage catalytic converter disposed at a location distant from the engine.

8. The method according to claim 7, wherein the energy introduced in the at least one thermal heating measure is maintained at a constant level during a desulphurization of the NOx storage catalytic converter.

9. The method according to claim 8, wherein the constant level is a highest applied level.

10. The method according to claim 1, wherein the at least one chemical heating measure includes a counter-acting lambda adjustment of individual cylinders of the internal combustion engine, wherein at least one first cylinder is operated with a lambda value which is leaner than a desired total lambda value, and at least one second cylinder is operated with a richer air-fuel mixture.

11. The method according to claim 10, wherein a partial exhaust gas flow exiting the at least one first cylinder and a partial exhaust gas flow exiting the at least one second cylinder each terminate in initially separate exhaust gas pipes each having at least one pre-catalytic converter, with the separate exhaust gas pipes being combined upstream of the catalytic converter to be heated.

12. The method according to claim 10, wherein the lambda adjustment is performed in that the at least one first cylinder is operated with a super-stoichiometric lambda value of $\Lambda>1$, and the at least one second cylinder is operated with a substoichiometric lambda value of $\Lambda<1$, with a total lambda value being in the range of 0.96 to 1.04.

13. The method according to claim 12, wherein the total lambda value is in the range of 0.98 to 1.02.

14. The method according to claim 12, wherein the total lambda value is in the range of 0.995 to 1.005.

* * * * *